(12) United States Patent
Gardner (10) Patent No.: US 8,395,798 B2
(45) Date of Patent: Mar. 12, 2013

(54) PRINTING OBJECTS USING A ROLLING BUFFER

(75) Inventor: Deane A. Gardner, Cupertino, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 296 days.

(21) Appl. No.: 12/837,276

(22) Filed: Jul. 15, 2010

(65) Prior Publication Data

US 2012/0013939 A1    Jan. 19, 2012

(51) Int. Cl.
*G06F 15/00* (2006.01)
*B41J 29/38* (2006.01)

(52) U.S. Cl. .......................... 358/1.15; 347/14

(58) Field of Classification Search ................... 358/1.15
See application file for complete search history.

(56) References Cited

U.S. PATENT DOCUMENTS

| | | |
|---|---|---|
| 4,598,323 A | 7/1986 | Honjo et al. |
| 4,825,227 A | 4/1989 | Fischbeck et al. |
| 4,937,598 A | 6/1990 | Hine et al. |
| 5,659,346 A | 8/1997 | Moynihan et al. |
| 5,757,391 A | 5/1998 | Hoisington |
| 6,266,439 B1 | 7/2001 | Pollard |
| 7,360,853 B2 | 4/2008 | Barss |
| 7,566,118 B2 | 7/2009 | Bibl et al. |
| 2002/0026879 A1 | 3/2002 | Goldstein |
| 2006/0082812 A1 | 4/2006 | Gardner et al. |
| 2006/0082813 A1 | 4/2006 | Martin et al. |
| 2006/0082814 A1* | 4/2006 | Gardner ............... 358/1.15 |
| 2006/0092437 A1 | 5/2006 | Martin |
| 2007/0236535 A1 | 10/2007 | Baker et al. |
| 2008/0030536 A1 | 2/2008 | Furukawa et al. |
| 2009/0303266 A1 | 12/2009 | Baker et al. |
| 2010/0238219 A1* | 9/2010 | Rueby et al. ........... 347/14 |

OTHER PUBLICATIONS

International Search Report and Written Opinion for PCT/US2011/043942 mailed Mar. 13, 2012, 8 pages.

* cited by examiner

*Primary Examiner* — Saeid Ebrahimi Dehkordy
(74) *Attorney, Agent, or Firm* — Fish & Richardson P.C.

(57) ABSTRACT

An electronic architecture for an imaging data path allows for printing on objects that are unevenly spaced. The architecture uses a rolling image buffer into which images are copied. A hardware trigger can optionally be used in conjunction with the rolling image buffer to prevent any printing mismatches that could otherwise be caused by a software delay. The trigger relates the physical location of the object to a virtual location in the image buffer.

19 Claims, 4 Drawing Sheets

PRINTING OBJECTS USING A ROLLING BUFFER

BACKGROUND

Ink jet printers are one type of apparatus for depositing drops on a substrate. Ink jet printers typically include an ink path from an ink supply to a nozzle opening from which ink drops are ejected. Ink drop ejection is typically controlled by pressurizing ink in the ink path with an actuator, which may be, for example, a piezoelectric deflector, a thermal bubble jet generator, or an electrostatically deflected element. A typical print assembly has an array of ink paths with corresponding nozzle openings and associated actuators. Drop ejection from each nozzle opening can be independently controlled. In a drop-on-demand print assembly, each actuator is fired to selectively eject a drop at a specific pixel location of an image as the print assembly and a printing substrate are moved relative to one another. In high performance print assemblies, the nozzle openings typically have a diameter of 50 microns or less, e.g., around 25 microns, and are separated at a pitch of 100-1200 nozzles/inch.

A piezoelectric actuator has a layer of piezoelectric material, which changes geometry in response to an applied voltage. The change in geometry of the piezoelectric layer and a corresponding bending of a membrane adjacent to the piezoelectric layer pressurizes ink in a pumping chamber located along the ink path. Piezoelectric ink jet print assemblies are also described in Fishbeck et al U.S. Pat. No. 4,825,227, Hine U.S. Pat. No. 4,937,598, Moynihan et al. U.S. Pat. No. 5,659,346 and Hoisington U.S. Pat. No. 5,757,391, the entire contents of which are hereby incorporated by reference.

SUMMARY

In one aspect, a computer-implemented method of printing on objects includes receiving a trigger indicating a printable object on a conveyor, in response to receiving the trigger, copying a bitmap image into a rolling image buffer, and printing on the printable object using the bitmap image in the rolling image buffer.

This and other implementations can optionally include one or more of the following features. The rolling buffer may rotate at a virtual speed equal to a physical speed at which the conveyor moves the printable object. Receiving a trigger may include storing a buffer position counter value into a hardware latch or FIFO register, and using the stored value to determine a position to copy the bitmap image into the image buffer. The bitmap image may correspond to a plurality of objects on the conveyor. A plurality of bitmap images may be copied into the rolling image buffer. Copying may include performing an "OR" function to copy the plurality of images into the rolling image buffer. That the printable object is at a particular angle of rotation may be determined, and the bitmap image may be rotated to the particular angle of rotation prior to copying the bitmap image. The computer-implemented method of claim 1, further comprising erasing The bitmap image may be erased from the rolling image buffer after printing on the printable object. The rolling image buffer may have a circumferential length and the bitmap image may have a corresponding length that is less than one half of the circumferential length of the bitmap image. The circumferential length may be at least one foot. The rolling image buffer may have a width equal to a width of a printhead of a drop ejection device. Copying a bitmap image into a rolling image buffer may include determining an offset between a location where a printing device deposits drops of fluid onto a conveyor and a location on the conveyor that the printable object was located as indicated by the trigger. Location A of the rolling image buffer may virtually contact the conveyor at location B on the conveyor, and location B on the conveyor may be a location where drops of printing fluid are ejected and would land on the conveyor if the printable object were not on the conveyor. Copying a bitmap image may include copying the bitmap image into the rolling image buffer at a location of the rolling image buffer that is a distance from location A equal to a distance of location B on the conveyor to a location C on the conveyor where the printable object was detected as indicated by the trigger. An indication of a trailing edge of the printable object on the conveyor may be received. A size of the bitmap image may be determined based on a leading edge of the printable object as indicated by the trigger and the trailing edge of the printable object. A hardware device may receive the trigger and store a buffer position counter value. The hardware device may track a rotational cycle of the rolling image buffer. The hardware device may instruct a drop ejection device to eject droplets of fluid according to the bitmap image.

In one aspect, a system for printing on objects includes a hardware device configured to receive a trigger indicating a printable object on a conveyor, a computing device including a processor and memory, wherein the memory stores a rolling image buffer and the processor is configured to copy a bitmap image into the rolling image buffer, and a printing device configured to print on the printable object using the bitmap image in the rolling image buffer.

This and other implementations can optionally include one or more of the following features. An encoder may track a movement of the conveyor. A sensor may send the trigger to the hardware device that indicates when a leading edge of a printable object is detected. The hardware device may associate the trigger with a current buffer position counter value. The processor may receive the buffer position counter value and uses the buffer position counter value to determine a location in the rolling image buffer at which to copy the bitmap image. The hardware device may track a rotational cycle of the rolling image buffer and instructs the drop ejection device to eject droplets of fluid according to the bitmap image.

Potential advantages may include none, one, or more of the following. Since the objects to be printed on are not aligned, they do not need to be touched, therefore, the apparatus can print on objects in a deformable state (e.g., wet, soft, uncured, or uncooked), such as cookies prior to baking or cupcakes covered in wet icing. Bitmap images to be printed can be copied into a rolling image buffer that resides in software. This can enable simple correspondence between randomly located printable objects and the printing instructions without needing to modify hardware. The software based buffer allows for flexibility of printing because the objects can be uneven or uncontrolled in their spacing and location. A hardware device is used in combination with the software to instantaneously capture the position of the printable object. Using a hardware device avoids any lag time that can be associated with using software to capture the same information. The software can then retrieve the position information from the hardware when it is ready to do so. This can increase the accuracy of the printing on the printable objects. Multiple images can be copied into the rolling image buffer, which therefore provides a location for compositing the images for printing, such as when multiple images are to be printed on a single object or multiple objects are to be printed on simultaneously. The system can be relatively easy to modify to suit a particular printing situation, including handling exceptions, such as ending printing when an object of unknown or undefined length ends.

The details of one or more implementations are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Early printing systems were limited to printing on individual sheets of paper or a continuous web of paper. More recent printing systems are able to print on just about any object, such as food, toys, or promotional items. Typically, when printing on objects, the objects are placed on a conveyor and moved under a stationary printing apparatus. Some complications of printing on objects include being able to accurately print on multiple objects, which may or may not be equally spaced apart from one another on the conveyor and may or may not be at the same orientation as one another. Changing the image being printed or the object being printed on can further complicate the printing process. By providing a rolling image buffer, data for accurately printing on multiple objects, regardless of their variability in shape, orientation or spacing on the conveyor, can be relayed to the printing device.

Figure 1:
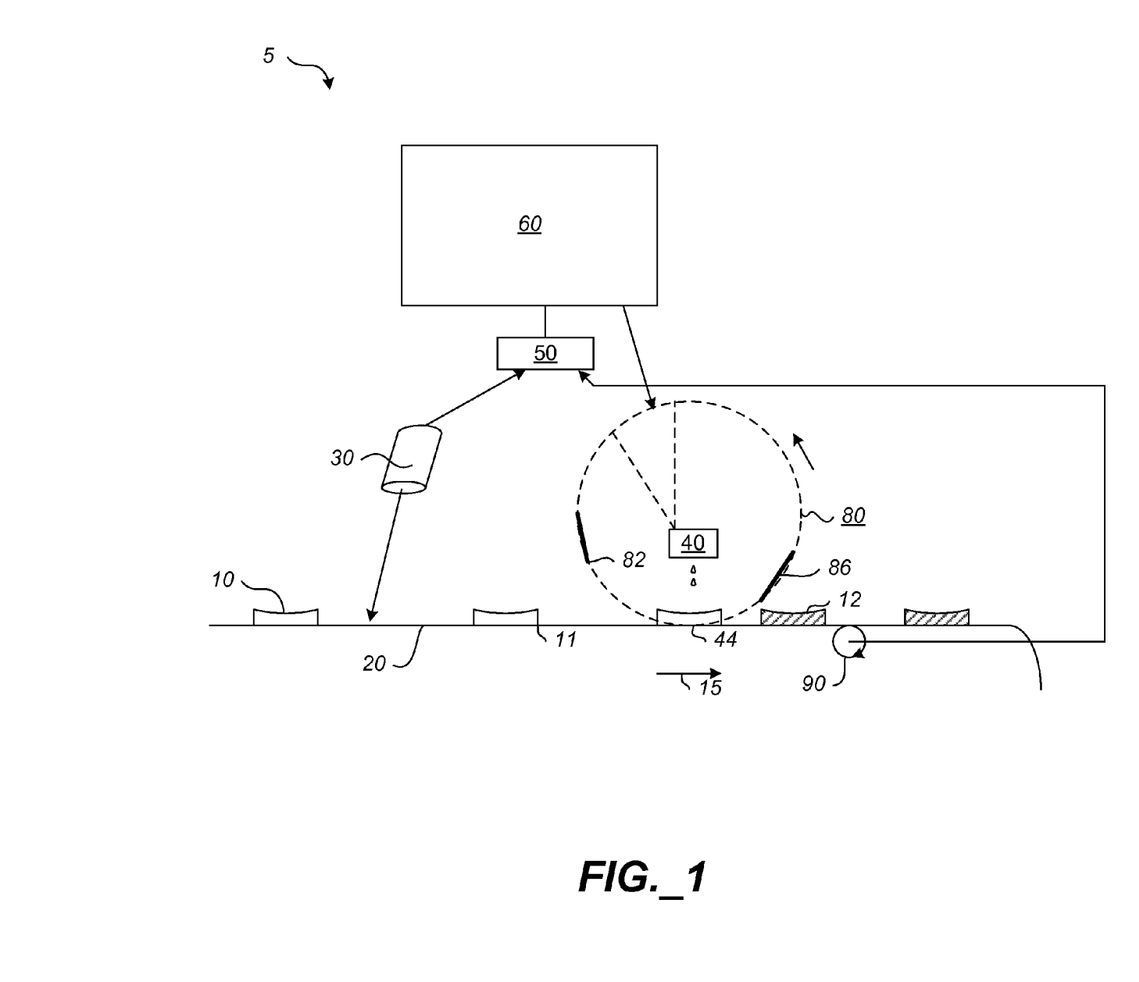
FIG. 1 is a schematic of a printing system with a rolling image buffer.

Referring to FIG. 1, a printing system 5 includes a conveyor 20 for moving a plurality of printable objects 10 in a process direction 15 (e.g., a Y-direction) toward a drop ejection device 40. The drop ejection device 40 can be stationary relative to the conveyor 20. The drop ejection device 40 can include a plurality of jetting arrays for depositing fluid droplets on the printable objects 10. Each array can include a multiple of jetting modules. Multiple jetting modules may be assembled into a print bar that spans the width (e.g., an X-direction or cross-process direction, which is perpendicular to the Y-direction of conveyor movement) of the conveyor to enable the drop ejection device 40 to perform single-pass printing across an entirety of the width of the conveyor if a single jetting module is not sufficiently wide enough to span an entirety of the width of the conveyor. Furthermore, each jetting array can include a plurality of modules, such as four modules (e.g., one module for each ink color, CMYK). Exemplary jetting modules are described in U.S. Pat. No. 7,566,118, which issued on Jul. 28, 2009.

A sensor 30 can detect a printable object 10, e.g., sense a leading edge 11 of the object. The sensor 30 may alternatively or also detect the trailing edge of the object. The sensor 30 can include a camera (e.g., a charge coupled device (CCD) camera) or simply a light sensor configured to detect when an object is on the conveyor. The sensor is positioned so that it can detect an object when the object is sufficiently far from the drop ejection device 40 that, given the speed of the conveyor, there is sufficient time for the controller to modify the rolling image buffer 80, as discussed below, before the object passes below the jetting assemblies. Providing at least a few hundred milliseconds of processing time can be sufficient. In some implementations, the sensor substantially spans the width of the conveyor in the cross-process direction, and the sensor is stationary relative to the conveyor 20. The sensor can detect more than one object at a time. In addition to detecting printable objects 10 in the process direction, the sensor 30 can detect the position of the printable objects in the cross-process direction.

When the sensor detects an object, the sensor can send a signal to a controller 60 (e.g., a computer or a non-transient computing device). The controller 60 can be a single device or a number of devices able to communicate with one another. In some implementations, the signal is received by a register 50 that is implemented in hardware. The register 50 can either be a part of the controller 60 or a physically separate device from the controller. The register 50 stores a buffer position counter value that corresponds to the virtual angular position of the rolling image buffer when the leading edge 11 of the object is detected by the sensor 30. In some implementations, the signal from the sensor is a trigger signal and the register 50 stores the virtual angular position of the buffer at the time of receipt of the trigger signal, e.g., the buffer position counter 140 discussed below. In some implementations, register 50 includes a trigger position-capture register or a first in first out (FIFO) queue register. Alternatively, the register 50 can store a buffer position value that corresponds to the virtual position of the leading edge 11 in the buffer e.g., by adding an offset value to the value of a buffer position counter at the time of receipt of the trigger signal.

In some implementations, the register 50 is also in communication with a rolling encoder 90. The rolling encoder 90 tracks the movement of the conveyor or determines the speed at which the conveyor 20 is moving in the process direction and thus the speed at which the printable objects 10 are moving past the drop ejection device 40. For example, the encoder 90 can generate and send timing signals to the register 50 or controller 60 representing the physical movement of the conveyor 20. The conveyor 20 may not operate at a constant rate. That is, conveyor 20 may speed up or slow down as it is running. Therefore, using a position of the objects in combination with the encoder 90 can accurately determine when printing should occur.

Figure 2:
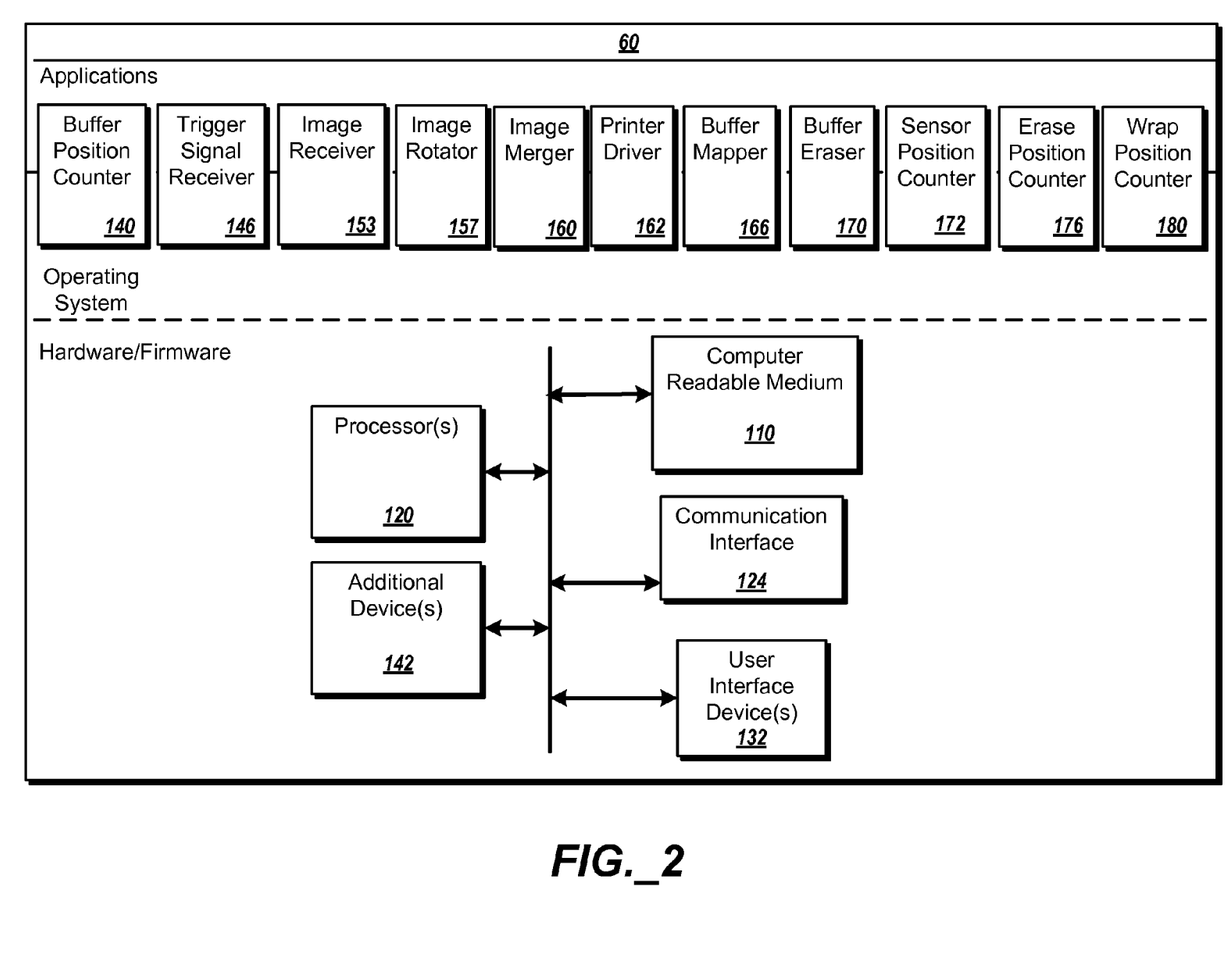
FIG. 2 is a schematic of a controller.

The register 50 communicates with other components of the controller 60. Referring to FIG. 2, the controller 60 can include various modules, e.g., executable software programs, including a buffer position counter 140, a trigger signal receiver 146, an image receiver 153, an image rotator 157, an image merger 160, a printer driver 162, a buffer mapper 166, a buffer eraser 170, a sensor position counter 172, an erase position counter 176 and a wrapping position counter 180. Each module runs as a part of the operating system on the controller, runs as an application on the controller or runs as part of the operating system and part of an application on the controller.

The rolling buffer position counter 140 is a counter configured to count up to a preset value and then reset. Its contents reflect the current virtual rotational angle of rolling image buffer 80. The preset value is the length of the rolling image buffer, such as in image lines or pixels. The trigger signal receiver 146 receives a trigger signal, which in some implementations is a position counter value, from a hardware device. The image receiver 153 can request and/or receive images from a database that are to be used to create the image to be printed on the pre-preprinted objects. The image rotator 157 can rotate the images to align an image with a corresponding printable object. The image merger 160 can merge a plurality of images, or an image with text to form a composited image. The printer driver 162 drives the drop ejection device. The buffer mapper 166 determines where in the rolling image buffer to place the composited image. The buffer mapper 166 can use the position counter value to determine how to map the image, as described further below. The buffer eraser 170 can erase images from the buffer after they have been used. In some implementations, only a portion of an image, one image or multiple images are erased from the buffer at a single time by the buffer eraser 170. The sensor position counter 172 can determine when to trigger the sensor when it requires activating. The erase position counter 176 can work with the buffer eraser 170 to determine when to erase images from the rolling image buffer. The wrapping position counter 180 can indicate when a further device, such as a hardware device, is to be activated. The functions of each of these modules are described further herein.

The controller 60 can also have hardware or firmware devices including one or more processors 120, one or more additional devices 142, computer readable medium 110, a communication interface 124, and one or more user interface devices 132. Each processor 120 is capable of processing instructions for execution within the controller 60. In some implementations, the processor 120 is a single or multi-threaded microprocessor, for example. Each processor 120 is capable of processing instructions stored on the computer readable medium 110 or on another storage device. The controller 60 uses its communication interface 124 to communicate with one or more computers, for example, over a network. Examples of user interface devices 132 include a display, a camera, a speaker, a microphone, a tactile feedback device, a keyboard, and a mouse.

In some implementations, a data pump card is the hardware device that receives the buffer position counter value, described further below, a signal from the encoder that indicates that speed at which the conveyor is moving, maintains and has a trigger position capture register to capture the buffer position counter value when the trigger occurs. The data pump card can keep track of where in a rotational cycle a rolling image buffer is and where in the rotation of the rolling image buffer the trigger occurs. The data pump card can take data, e.g., data corresponding to a bitmap, out of the rolling image buffer and send it to the drop ejection device.

The controller 60 can store instructions that implement operations associated with the modules described above, for example, on the computer readable medium 110 or one or more additional devices 142, for example, one or more of a floppy disk device, a hard disk device, an optical disk device, or a tape device. In some implementations, the controller 60 also stores additional data on the computer readable medium 110 or one or more additional devices 142.

Referring back to FIG. 1, the controller 60 provides printing instructions to the drop ejection device 40. The drop ejection device 40 can be an integral part of the controller or a physically separate device from the controller 60. The controller 60 stores printing information in a rolling image buffer 80, which instructs the drop ejection device 40 when and how to eject droplets onto the printable objects 10. The rolling image buffer 80 can be envisioned as a buffer that is circular, e.g., cylindrical. The rolling image buffer 80 can have a circumference, e.g., in pixels or scan lines, of any length of convenient value as determined by the application, but can represent one to several feet or meters of printing length along the conveyor. In some implementations, the minimum circumferential buffer length is a distance between the print head droplet depositing location and the distance at which the trigger sensor detects the printable object divided by the conveyor speed. The rolling image buffer 80 has a width, e.g., in pixels, that corresponds to the number in nozzles of the drop ejection device 40 in the cross-process direction.

The buffer virtually rolls at the same speed as the conveyor moves the objects, as if one radial section of the buffer is in contact with the conveyor, such as a section 44 that is located just under the drop ejection device 40, and the buffer is being rotated by the movement of the conveyor. The buffer rolls continuously to match conveyor motion. In some implementations, the rolling image buffer 80 rolls at a rate that is based on a rate that the rolling encoder determines the conveyor 20 to be moving at. In some implementations, the buffer position counter is incremented so that each consecutive value is equal to a pixel spacing in an image to be printed. Thus, if there is a pointer to the portion of an image that is currently being printed, as the conveyor moves the object a distance at which the next line of pixels is to be printed, the pointer is moved to the next scan line of the image in the rolling image buffer 80. Thus, the location of image data in physical memory need not be modified as the buffer rolls; rather, the virtual angular position of the rolling image buffer is represented by the buffer position counter and the position of the pointer.

In some implementations, the image data to be printed can be conceptualized as being located within a portion 82 of the rolling buffer 80 that aligns with the object 10 once the object 10 is at a location at which the drop ejection device 40 can print on the object. Data that has already been printed on a printed object 12 is on a portion 86 of the buffer 80 that aligns with the already printed objects 12. Thus, the buffer 80 acts as a virtual print drum. Data in the portion 86 of the buffer 80 that has already been printed can be discarded.

Figure 3:
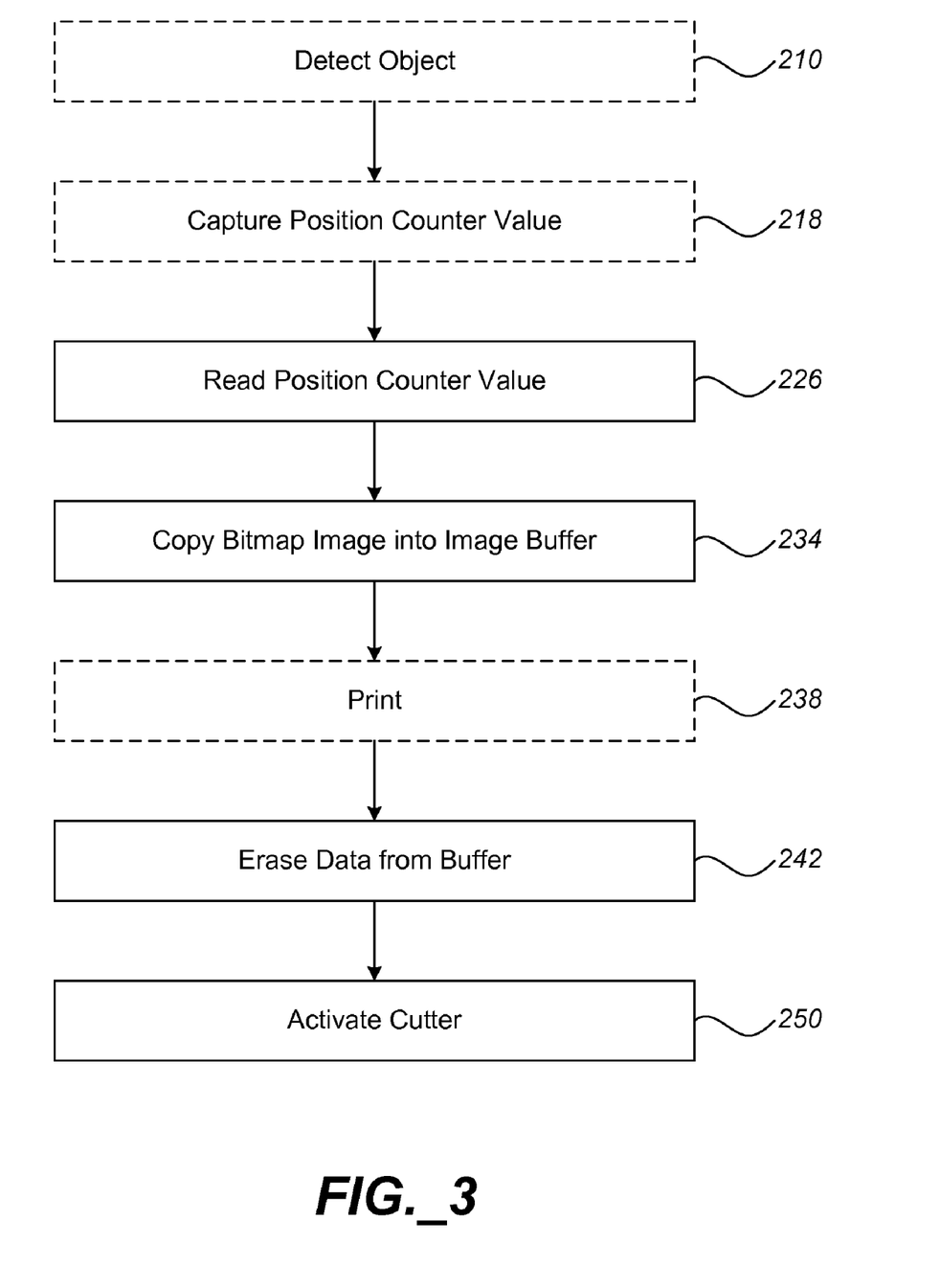
FIG. 3 is a flow diagram of printing on objects.

Referring to FIG. 3, the printing system operates to print on the objects as follows. Although a particular order is listed for each of the steps, some of the steps can be performed in a different order. A trigger signal is received indicating that a position of an object has been detected (step 210). The trigger signal is generated in some implementations by the sensor when the sensor detects an object to be printed on. The position data can be a single point (e.g., a leading edge) or a plurality of points representing the entire object.

The trigger signal is associated with a buffer position counter value that indicates the trigger signal timing (step 218). In some implementations, the trigger position-capture register, latch, queue or FIFO register captures the rolling image buffer position counter value. The captured buffer position counter value corresponds to a rotational position of the rolling image buffer at the time the printable object was detected. Controller 60 can use this captured value (plus an offset corresponding to the sensor-to-printhead distance) to copy an image bitmap into a location on the rolling image buffer that will virtually contact the leading edge of the printable object when the object moves under the printing location. The buffer position counter's count range exactly matches the length of the circumference of the rolling image buffer in scan lines or pixels. The buffer position counter increments with every writing interval or scan line of the drop ejection device. In some implementations, the writing interval is derived in part from the rolling encoder. In some implementations, the writing interval depends on the spacing of jetting devices in the drop ejection device, e.g., if there are multiple rows that eject the same fluid, and the firing interval of the jetting devices of the drop ejection device. After the buffer position counter reaches its maximum value, it returns to zero and begins incrementing again. Thus, the position counter value tracks the virtual rotational position of the rolling image buffer as printing progresses.

In some implementations, the position counter value is captured by a hardware device, e.g., the value goes into a hardware latch. This ensures that there is no lag time that can be associated with software determining the position counter value. With software, the lag time can be inconsistent and thus may not be able to accurately capture the position counter value. The software then only needs to obtain or read the position counter value from the hardware latch when the software is ready (step 226). In some implementations, the software or controller is signaled that a trigger has occurred. For example, the controller can be signaled though a signal interrupt or a polling operation.

In some implementations, there is a sensor position counter with a wrap length that is shorter than the buffer position counter, e.g., is 1/nth of the n length buffer position counter. The sensor position counter can emit a signal to the sensor to capture, e.g., video frames. The video frames can be analyzed for the presence of a printable object. The wrap length of the sensor position counter can determine the maximum length of the bitmap image, which is described further below.

A bitmap image includes data that instructs the drop ejection device to form an image on the printable object. The bitmap image can be created before or after the position counter value is obtained. The bitmap image can be composited from one or more source images of various types. For example, the bitmap image may merge a standard image, such as a photograph with text, where the text is modifiable for each bitmap image that is created. Alternatively, two or more variable images can be merged to form a bitmap image for printing on one or more objects. If the printing device were printing brownies, an image of an animal could be printed with a child's name under the image. Each brownie could be printed with a different animal or name. Or puzzles could be printed with one animal face on top and a different animal body on the bottom, where each piece has different combinations. The source image can be a bmp image or other type of compressed image, such as a jpeg, tiff, png, or gif.

The maximum size of the bitmap image corresponds to the width of the rolling image buffer by the distance that is to be printed. The maximum bitmap length should take up only a fraction of the rolling image buffer circumferential length, such as less than one-half of the length, for example, less than one quarter of the length or less than one-tenth the length. The bitmap image should be small enough with respect to the rolling image buffer that it can be erased in time to copy a new bitmap image to print on incoming preprinted objects. If the sensor is a camera and a sensor position counter is used to signal the camera to capture a new image for determining what objects the bitmap should be composited for, the maximum Y-direction length of the bitmap image is the wrap length of the sensor position counter.

The bitmap image is then copied into the rolling image buffer (step 234). For example, the bitmap image is taken out of an input queue of bitmap images to be copied into the rolling image buffer. The bitmap image is copied into a portion of the rolling image buffer that corresponds to the position counter value captured in the trigger position capture register when the trigger is received. A pointer to the portion of the rolling image buffer that is instructing the drop ejection device to print is a number of scan lines or pixels away from a location in which the bitmap image is copied into the rolling image buffer. Thus, there is an offset between the block of data that is currently being printed by the drop ejection device and the location in the rolling image buffer that corresponds to the position counter value. The copying copies the bitmap image into the rolling image buffer at the location according to the offset. This location is generally equal in scan lines to the physical distance between where the sensor senses the object on the conveyor and the drop ejection device, where the scan line distance is the distance between pixels in the process direction that the drop ejection device is able to print. If the sensor is directly over the objects and senses the objects as they pass beneath the sensor, then the location is equal to the distance between the sensor and the drop ejection device. If the sensor detects the objects prior to their reaching the sensor, that distance is added to the distance between the sensor and the drop ejection device to determine the location of the start of the bitmap image in the rolling image buffer.

The bitmap image is copied into the buffer using data from the sensor that indicates the X-Y position of each printable object on the conveyor. In some implementations, when the trigger is received, an X-Y position of the object is determined. The X-Y position can include the rotation of the object. A corresponding X-Y position of the bitmap image is determined from the X-Y position of the object on the conveyor. The bitmap image is then copied into the input queue with an appropriate location corresponding to the X-Y position. In addition, if there are multiple printable objects on the printer, for example, along the X-direction (cross process direction), a bitmap image is copied for each of these objects. That is, if there are five marshmallow chick-shaped candies moving under the drop ejection device to be printed on at a single time, five bitmap images can be copied into the buffer along the X direction for printing. In some implementations, the copying is done with a bitwise "OR" operation to allow printing on objects that are spaced closer together than the extent of a printhead in Y-direction.

Optionally, when the bitmap image is copied into the buffer, the bitmap images can be rotated if necessary to match the orientation of the object. In this case, the sensor must be able to communicate sufficient information to the controller to indicate the orientation of the object for the rotation of the image to be matched with the object. As an alternative to rotating the bitmap image, rotated bitmap images can be stored and the appropriate rotated bitmap image can be copied into the rolling image buffer.

When the bitmap image on the rolling image buffer is under the drop ejection device, the drop ejection device prints the bitmap image onto the object or objects under the drop ejection device (step 238). In some implementations, only a single scan line of the rolling image buffer content is printed at a single time. Therefore, as the object is advanced by the conveyor, a new scan line in the rolling image buffer is printed by the drop ejection device. If each increment of the counter for the rolling image buffer corresponds to a single scan line, then as the rolling image buffer advances a single counter value, a new scan line is printed. Because of the potential random orientation and spacing of the objects, two or more consecutive bitmap images may be required to print on a number of objects. These bitmap images can simply be serially placed into the buffer. Thus, there is no visible seam or change between the two images when the two images overlap a single object being printed on.

There can be bitmap images in the buffer that virtually contact one another or there can be bitmap images in the buffer that are spaced apart from one another, depending on the spacing of the objects. In some implementations, the sensor is a camera that takes snapshots of the images on the conveyor. To ensure that no information is lost, these snapshots are taken at intervals that result in overlapping objects in consecutive snapshots. When the bitmaps are formed, duplicate information from the overlapping snapshots can be ignored, such as by ignoring the information from the later snapshot in time. In some implementations, the sensor detects a finite number of objects in a single snapshot. In this situation, the sensor may detect the same printable object in two different images and could cause bitmap images to be created for the same object twice. In this case, a step of determining that the same object has been captured by the sensor is performed. One of the objects is discarded and only one bitmap image is used for printing.

Image data can be comprised of scan lines including binary data, 1s and 0s (1 is active, 0 is inactive), meaning the drop ejection device will deposit a fluid droplet where there is a 1 and not deposit a fluid droplet where there is a 0. The bitmap image data can be copied to the rolling image buffer, for example, by using an "AND", "OR" or "REPLACE" function.

The "OR" function enables the drop ejection device to print complete images without interruption on objects that are next to each other with little or no gap between the objects. For example, two objects are next to each other on a conveyor such that they are touching as they traveling down the conveyor to a drop ejection device. A sensor detects the first object and sends a trigger signal to the controller. Soon after, the sensor detects the second object and sends another trigger signal to the controller. The controller adds a first image data to the buffer memory using the "OR" function. Next, the controller adds the second image data to the buffer memory using an "OR" function, such that if the first image data overlaps with the second image data, then the drop ejection device will print the 1s that are overlapped with 0s. The "OR" function combines the binary data of the two image data, and the buffer memory enters a 1 if a 1 and 0 overlap. Thus, the bottom portion of the first image data will not block the top portion of the second image data, and the drop ejection will print both complete images on the corresponding first and second objects. Copying bitmap images into the rolling image buffer using the "OR" function allows the system to not need to merge images prior to copying the images. Although composited images can be created asynchronously from any of the object detecting and copying functions, the "OR" function means that image merging is not necessary. That is, compositing essentially occurs because of the copying function into the rolling image buffer.

The "REPLACE" function can be used when objects of an unknown length are being printed on, as described further below. When the end of the object is detected, the 1s that indicate that part of the bitmap image should be printed after the end of the object can be replaced with 0s to end printing. The replacing therefore erases the end of the bitmap image without relying on the erase function to erase the buffer memory. Periodically erasing the buffer memory may not erase the end of a bitmap object as quickly as using the "REPLACE" function and may result in wasted printing fluid or undesirable overprinting onto the conveyor.

The "AND" function can be used, but may result in erasing data from overlapping bitmap images.

Once the objects that take up the space corresponding to the bitmap image have all been printed on, or alternatively, when all of the information from the bitmap image has been used to print on the objects, the bitmap image is no longer needed. Thus, the bitmap image is erased from the rolling image buffer (step 242). Optionally, an erase position counter with a wrap length shorter than the buffer position counter can indicate when to erase a bitmap image from the buffer. The erase position counter can indicate that an erase needs to occur more than one time during a rotation of the rolling image buffer. In some implementations, the erase position counter is 1/mth of the buffer position counter, such as every $1/10^{th}$ or every $1/15^{th}$ of the buffer. The erase signal may not erase an entire bitmap image, but may erase just a fraction of the bitmap image, such as the fraction that has already been printed, leaving the rest of the bitmap image that is on the portion of the buffer that corresponds to pre-preprinted objects in the buffer.

Optionally, there is another hardware device, such as a cutter, that is activated after printing (step 250). A further wrapping position counter with a length shorter than the buffer position counter can be used to periodically signal the hardware device several times per buffer revolution. For example, this signal can operate a cutter, which cuts in the X-direction of the conveyor.

Because the sensor can sense more than just the leading edge of the printable object, such as two or more edges, e.g., the leading edge or the trailing edge, or the entire outline of the printable object, irregular-length objects can be printed on. For example, the sensed or captured leading edge can be used to cause a longer bitmap image to be copied into the buffer than the object is expected to be. The sensed or captured trailing edge can be used to trigger the erase function of the end portion of the bitmap from the image buffer. Thus, the bitmap image can be truncated on the fly to exactly match the length of each object on the conveyor.

In some implementations, the rotating image buffer is pre-loaded with fixed bitmap images and is allowed to repeatedly print the same data onto a continuous web of material. The erase position counter is not used, but the further wrapping position counter can output a signal to trigger a crosswise cutter to singulate finished prints on the web. The image buffer length is configured to be an integer multiple of the sum of the image length and any unprinted space.

In addition or as an alternative to the options presented above, if a web of material is printed on, an end-of-roll mark can be added to print a repeating image onto an end of a roll of material.

Figure 4:
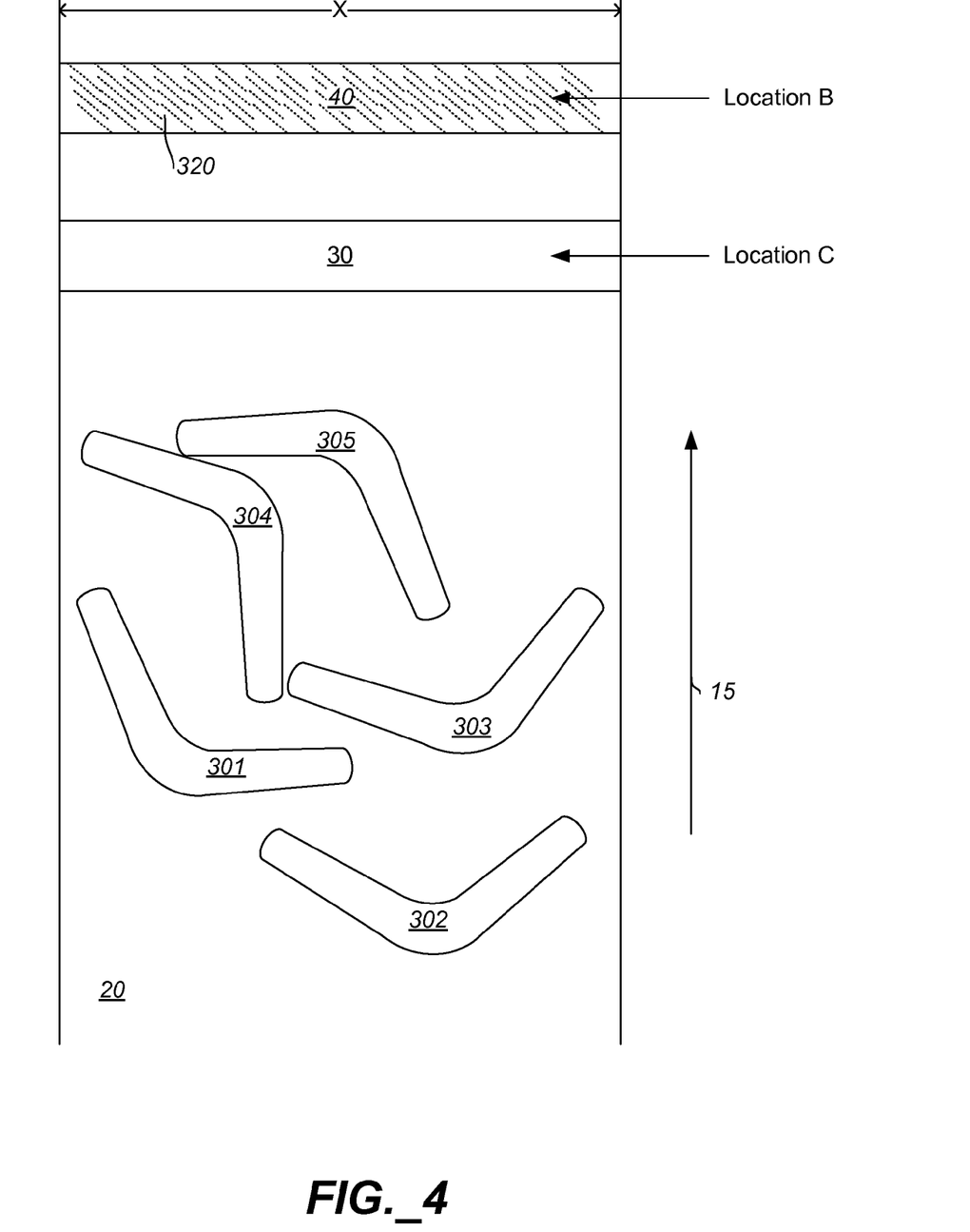
FIG. 4 is a schematic plan view of printing on boomerangs.

Referring to FIG. 4, a series of objects, here boomerangs, are to be printed on. The boomerangs 301-305 are randomly oriented across a width in the X-direction of the conveyor 20. The drop ejection device can include modules with interdigitated nozzles. Each row of nozzles spans the width of the conveyor or at least the portion of the width of the conveyor that the printable items are on during the printing process. A single row of jets and corresponding nozzles can include multiple modules to ensure that the desired printing width is covered by the nozzles. In some implementations, each module has jets 320 that are about a hundredth of an inch apart. Thus, a module that is about 2.5 inches wide can have about 256 jets and each section of four printing nozzles, such as four colored printing nozzles, has a total of (4×256) 1024 jets. The interdigitated nozzles from the four modules can print 400 dpi.

As the boomerangs 301, 303, 304 and 305 pass under the sensor 30, they can each be printed on at the same time with the drop ejection device 40, such as a printhead of the drop ejection device 40. That is, the drop ejection device 40 can print on multiple objects at one time. In particular, the drop ejection device 40 will begin printing on boomerang 305, which passed under the sensor 30 and the drop ejection device 40 first, but before boomerang 305 is completely printed on the drop ejection device 40 will begin printing on boomerang 304. Once boomerang 305 almost completely printed on, printing on boomerangs 301 and boomerang 303 begins. Thus, four different bitmap images that touch or overlap are placed into the buffer 80. Once printing on the next object on the conveyor 20 begins, that is on boomerang 302, the bitmap images for the preceding boomerangs can be erased from the buffer.

In some implementations, determining where to copy the bitmap image into the sensor proceeds as follows. The sensor 30 determines a location of the leading edge of a printable object. This location is shown as being directly below sensor 30, as location C. However, the sensor could sense the printable objects at other locations, such as at locations further away from the sensor 30. Location C has been shown as below the sensor 30 for the sake of simplicity. The drop ejection device ejects drops of fluid onto the object at location B. The rolling image buffer, not shown in FIG. 4, contacts the conveyor 20 at its own location A, which corresponds to section 44 in FIG. 1. The bitmap image is copied into the rolling image buffer at a location of the rolling image buffer that is a distance from location A that is equal to a distance of location B on the conveyor to a location C on the conveyor where the printable object was detected as indicated by the trigger.

In some implementations, a printhead of the printing device does not have a single straight row of fluid ejection nozzles. To obtain a desired printing pitch many printheads stagger the nozzles away from a straight line. To properly print with such a printhead, the bitmap image can be distorted or scattered in a matrix to account for the nozzle arrangement. For example, even numbered pixels of a bitmap image may correspond to nozzles on one end of a printhead while the odd numbered pixels of the bitmap image correspond to nozzles at the opposite end of the printhead. Other layouts are of course possible. The layout described here may manifest itself as the even nozzles being at different locations along the process direction from the odd nozzles. Referring to FIG. 1, the even nozzles may be closer to the left end of the drop ejection device 40 while the odd nozzles are closer to the right end of the drop ejection device 40. To obtain a corresponding bitmap image, scattering can be achieved by rearranging the bitmap image according to a nozzle map or smear algorithm. This can be done to the bitmap images that are stored in memory or when the bitmap image is copied into the rolling image buffer. This accounts for the physical reality of the nozzles in the printhead. Alternatively, if the printhead has a single straight row of nozzles, the bitmap image can be the same as the image that appears on the printed object.

A number of implementations have been described. Nevertheless, it will be understood that various modifications may be made without departing from the spirit and scope of the techniques described herein. Accordingly, other implementations are within the scope of the following claims.

All references described herein are incorporated by reference for all purposes.

What is claimed is:

1. A computer-implemented method of printing on objects, comprising:
   receiving a trigger indicating a printable object on a conveyor;
   in response to receiving the trigger, copying a bitmap image into a rolling image buffer, wherein the rolling buffer is configured to rotate at a virtual speed equal to a physical speed at which the conveyor moves the printable object; and
   instructing a droplet ejection device to eject droplets on the printable object using the bitmap image in the rolling image buffer.

2. The computer-implemented method of claim 1, wherein receiving a trigger includes storing a buffer position counter value into a hardware latch or FIFO register, and using the stored value to determine a position to copy the bitmap image into the image buffer.

3. The computer-implemented method of claim 1, comprising copying a plurality of bitmap images into the rolling image buffer for printing on a plurality of printable objects.

4. The computer-implemented method of claim 3, wherein the copying includes performing an "OR" function to copy the plurality of bitmap images into the rolling image buffer.

5. The computer-implemented method of claim 1, further comprising:
   determining that the printable object is at a particular angle of rotation; and
   rotating the bitmap image to the particular angle of rotation prior to copying the bitmap image.

6. The computer-implemented method of claim 1, further comprising erasing the bitmap image from the rolling image buffer after printing on the printable object.

7. The computer-implemented method of claim 1, wherein the rolling image buffer has a circumferential length and the bitmap image has a corresponding length that is less than one half of the circumferential length of the bitmap image.

8. The computer-implemented method of claim 7, wherein the circumferential length is at least one foot.

9. The computer-implemented method of claim 1, wherein the rolling image buffer has a width equal to a width of a printhead of the drop ejection device.

10. The computer-implemented method of claim 1, wherein copying a bitmap image into a rolling image buffer includes determining an offset between a location where the droplet ejection device deposits drops of fluid onto a conveyor and a location on the conveyor that the printable object was located as indicated by the trigger.

11. The computer-implemented method of claim 1, wherein:
   location A of the rolling image buffer virtually contacts the conveyor at location B on the conveyor, location B on the conveyor is a location where drops of printing fluid are ejected and would land on the conveyor if the printable object were not on the conveyor; and
   copying a bitmap image includes copying the bitmap image into the rolling image buffer at a location of the rolling image buffer that is a distance from location A equal to a distance of location B on the conveyor to a location C on the conveyor where the printable object was detected as indicated by the trigger.

12. The computer-implemented method of claim 1, further comprising:
   receiving an indication of a trailing edge of the printable object on the conveyor; and
   determining a size of the bitmap image based on a leading edge of the printable object as indicated by the trigger and the trailing edge of the printable object.

13. The computer-implemented method of claim 1, wherein:
   a hardware device receives the trigger and stores a buffer position counter value;
   the hardware device tracks a rotational cycle of the rolling image buffer; and
   the hardware device instructs the drop ejection device to eject droplets of fluid according to the bitmap image.

14. A system for printing on objects, comprising:
   a hardware device configured to receive a trigger indicating a printable object on a conveyor;
   a computing device including a processor and memory, wherein the memory stores a rolling image buffer and the processor is configured to copy a bitmap image into the rolling image buffer, the rolling image buffer is configured to rotate at a virtual speed equal to a physical speed at which the conveyor moves the printable object; and
   a printing device configured to print on the printable object using the bitmap image in the rolling image buffer.

15. The system of claim 14, further comprising an encoder that tracks a movement of the conveyor.

16. The system of claim 14, further comprising a sensor that sends the trigger to the hardware device that indicates when a leading edge of a printable object is detected.

17. The system of claim 14, wherein the hardware device associates the trigger with a current buffer position counter value.

18. The system of claim 17, wherein the processor receives the buffer position counter value and uses the buffer position counter value to determine a location in the rolling image buffer at which to copy the bitmap image.

19. The system of claim 18, wherein the hardware device tracks a rotational cycle of the rolling image buffer and instructs the drop ejection device to eject droplets of fluid according to the bitmap image.

* * * * *

UNITED STATES PATENT AND TRADEMARK OFFICE
CERTIFICATE OF CORRECTION

| | | |
|---|---|---|
| PATENT NO. | : 8,395,798 B2 | Page 1 of 1 |
| APPLICATION NO. | : 12/837276 | |
| DATED | : March 12, 2013 | |
| INVENTOR(S) | : Deane A. Gardner | |

It is certified that error appears in the above-identified patent and that said Letters Patent is hereby corrected as shown below:

Specification

Column 1, line 56, delete "The computer-implemented method of claim 1, further comprising erasing"

Column 2, line 44, after "include", delete "none"

Column 7, line 7, replace "though" with -- through --

Column 9, line 29, after "drop ejection" insert -- device --

Signed and Sealed this
Twenty-seventh Day of October, 2015

Michelle K. Lee
*Director of the United States Patent and Trademark Office*